(12) United States Patent
Waymire

(10) Patent No.: US 11,566,740 B2
(45) Date of Patent: Jan. 31, 2023

(54) LOW PROFILE ELBOW

(71) Applicant: Evan Waymire, Oregon City, OR (US)

(72) Inventor: Evan Waymire, Oregon City, OR (US)

( * ) Notice: Subject to any disclaimer, the term of this patent is extended or adjusted under 35 U.S.C. 154(b) by 149 days.

(21) Appl. No.: 16/983,331

(22) Filed: Aug. 3, 2020

(65) Prior Publication Data

US 2022/0034437 A1 Feb. 3, 2022

(51) Int. Cl.
*F16L 43/02* (2006.01)
*F16L 43/00* (2006.01)

(52) U.S. Cl.
CPC .............. *F16L 43/02* (2013.01); *F16L 43/001* (2013.01)

(58) Field of Classification Search
CPC ......... F16L 43/02; F16L 43/001; F16L 43/00; F16L 43/002; F16L 43/003; F16L 43/005; F16L 43/006; F16L 41/001; F16L 41/004; F16L 41/007; F16L 41/02; F16L 41/08; F16L 41/082; F16L 41/084

USPC ................. 285/179–183, 189–222, 201–210
See application file for complete search history.

(56) References Cited

U.S. PATENT DOCUMENTS

| | | | | |
|---|---|---|---|---|
| 1,882,673 | A | * | 10/1932 | Ronan ................... B23K 33/004 285/179 |
| 2,066,775 | A | * | 1/1937 | Fritsch ................... F16L 43/001 285/179 |
| 2,495,615 | A | * | 1/1950 | Vander ................... F16L 41/084 285/141.1 |
| 5,570,719 | A | * | 11/1996 | Richards .............. B67D 7/3218 137/614.04 |
| 7,887,100 | B1 | * | 2/2011 | Paolone ................... F01N 13/18 285/288.1 |

\* cited by examiner

*Primary Examiner* — James M Hewitt, II
(74) *Attorney, Agent, or Firm* — Ingrid McTaggart

(57) ABSTRACT

A low profile elbow, and a process of manufacturing the same, includes a tube secured at two different location in two different planes of a base, wherein an end surface of the tube is positioned at an acute angle with respect to a tube axis, and wherein the tube defines a center of curvature positioned lower than a lower surface of the base.

20 Claims, 5 Drawing Sheets

SECTION A-A

FULL RADIUS ELBOW

RIGHT ANGLE TUBE FABRICATION

MITERED ELBOW FABRICATION

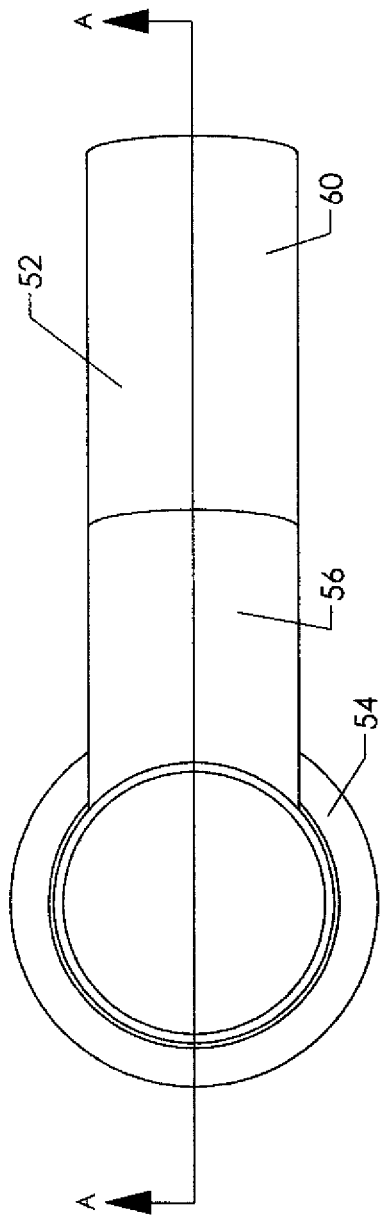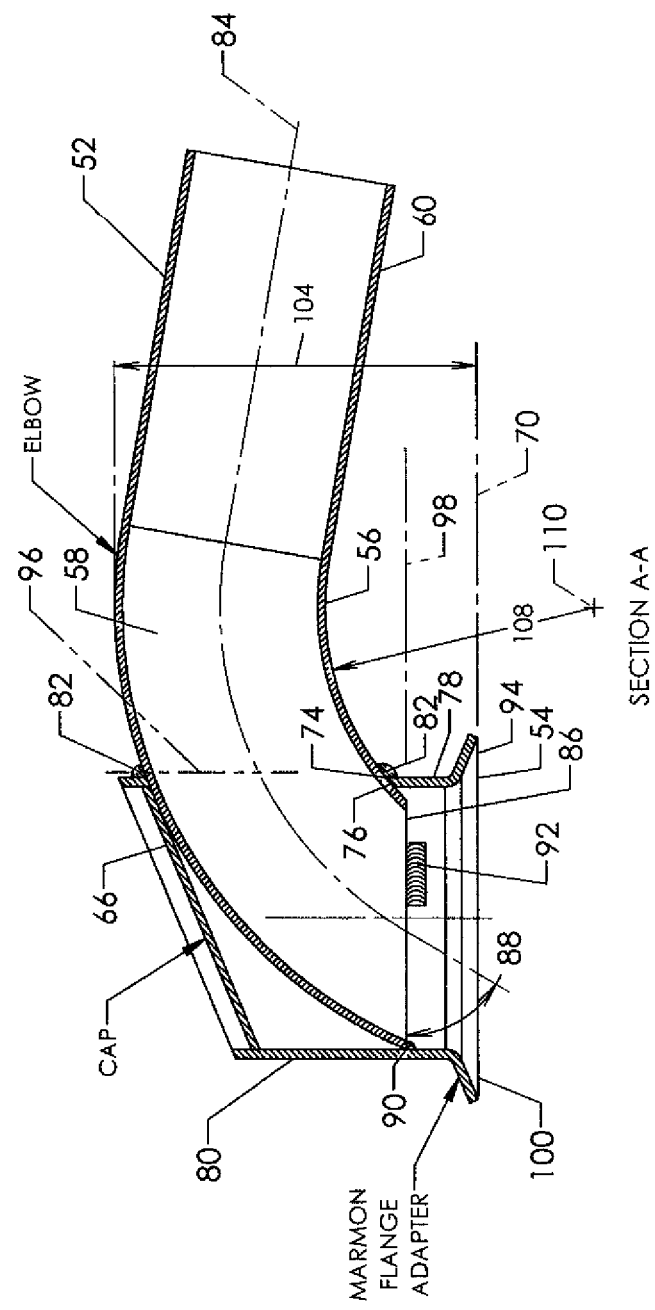

LOW PROFILE ELBOW

1. TECHNICAL FIELD

The present invention relates to an elbow, namely, an elbow used for air flow on internal combustion engines, such as exhaust air flow or intake air flow, that provides a low profile, low back pressure, and high vibration fatigue resistance, when compared to prior art exhaust elbows.

2. BACKGROUND OF THE INVENTION

Commercial Vehicles (such as long distance eighteen wheel trucks) and industrial equipment typically include an engine exhaust device using a full radius elbow which turns the exhaust gas flow from the engine through an angle of ninety degrees or more. These prior art full radius elbows define a height that often interferes with adjacent components in the engine compartment that are positioned directly adjacent the full radius elbow.

In order to reduce the height of the ninety degree turn of the exhaust gas when compared to the full radius elbow, some commercial vehicles utilize two tubes joined at a right angles. Such a design reduces the height of the engine exhaust device but presents a significant increase in resistance to exhaust gas flow, thereby increasing exhaust back-pressure. Engine manufacturers typically limit the maximum permissible exhaust back-pressure in applications for their engines. Right angle fabrications such as these typically exceed the maximum permissible back-pressure limits. A right angle fabrication of this type is also relatively weak and vulnerable to vibration fatigue failure because the end tube is only welded to one side of the base tube.

SUMMARY OF THE INVENTION

The present invention provides a low profile elbow, and a process of manufacturing the same, that overcomes the disadvantages of the prior art. One aspect of the present invention provides a mitered elbow that is significantly shorter in height than the prior art full radius elbow, thereby avoiding collision with adjacent components in the engine compartment. The mitered elbow of the present invention also produces a large reduction in exhaust back-pressure when compared to the right angle tube design of the prior art. The mitered elbow of the present invention also provides more resistance to vibration fatigue failure than the prior art elbows because the mitered elbow design includes an end tube secured at multiple locations, including being secured at two different sides of a base.

BRIEF DESCRIPTION OF THE DRAWINGS

FIG. 7 is a top view of the mitered elbow of the present invention showing a section line A-A.
FIG. 8 is a cross sectional side view of the mitered elbow of FIG. 7 taken along section line A-A.

DETAILED DESCRIPTION OF THE PREFERRED EMBODIMENTS

The present invention discloses a mitered elbow that allows an engine exhaust gas flow to be turned through ninety degrees while not interfering with adjacent components in an engine compartment, while not increasing back pressure within the exhaust system, and while providing a robust design that is not susceptible to vibration fatigue failure.

Figure 1:
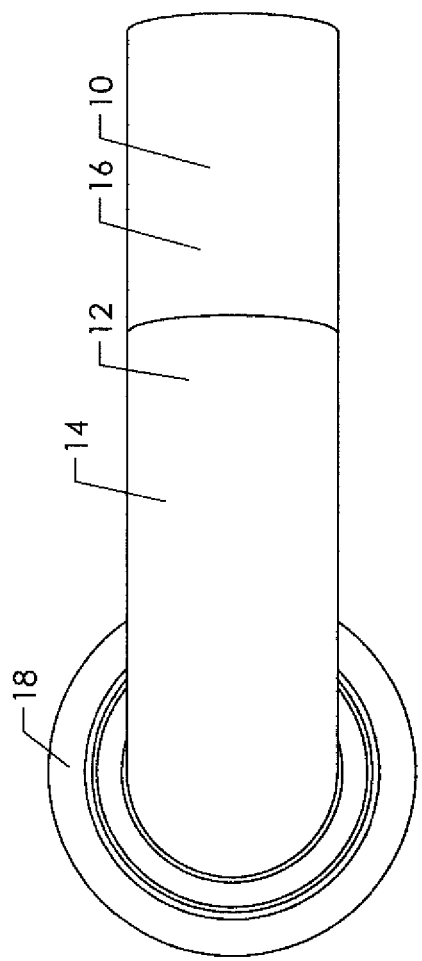
FIG. 1 is a top view of a prior art full radius elbow.

FIG. 1 is a top view of a prior art full radius elbow 10. Prior art elbow 10 includes a tube 12 including a bend region 14 that is secured to an extension tube 16 and a base 18.

Figure 2:
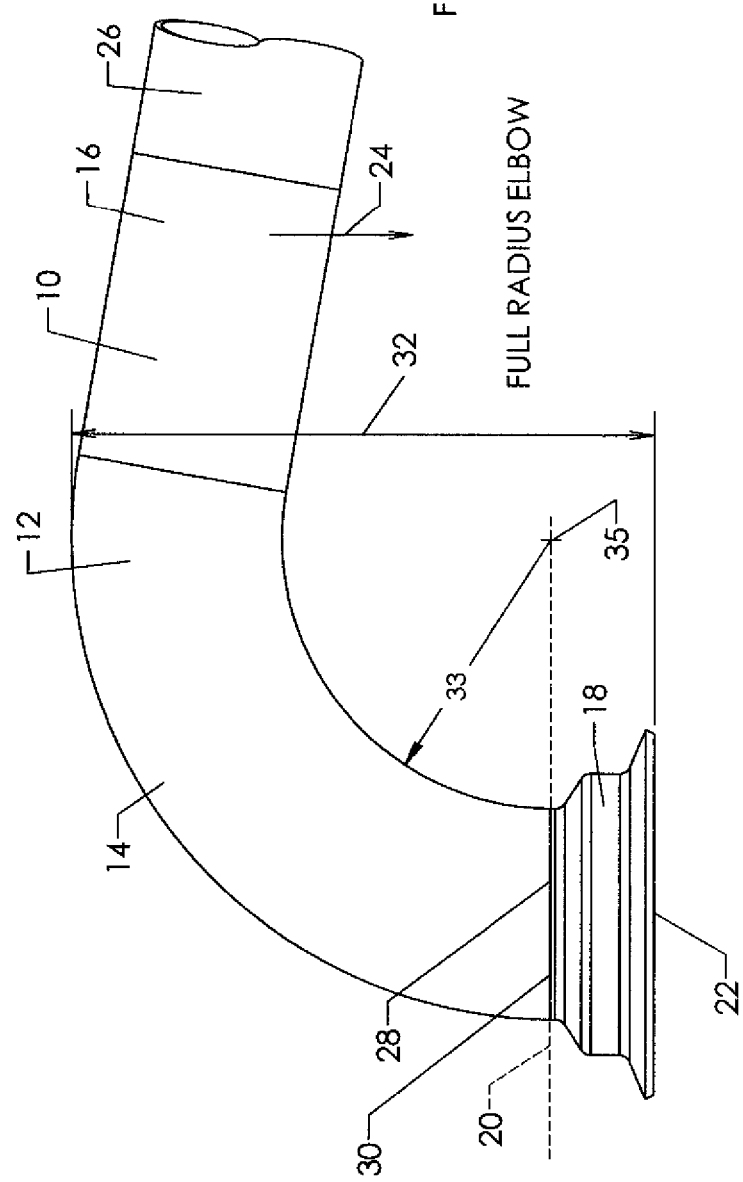
FIG. 2 is a side view of a prior art full radius elbow.

FIG. 2 is a side view of prior art full radius elbow 10. Tube 12 is secured to base 18, around a circumference of tube 12, in a horizontal plane 20 that is parallel to a bottom surface 22 of base 18. Additional lengths of tubing 26 may be secured to extension tube 16 so that exhaust may be directed to exit the engine compartment at a location remote from elbow 10. The weight of extension tube 16 and tubing 26, combined with the harsh environmental conditions the equipment is subjected to, which includes continuous engine vibration and uneven road conditions, cause stress on the connection region 28 in plane 20 between base 18 and tube 12, and particularly on the connection sub-region 30 that is on an opposite side of base 18 from extension tube 16. In other words, due to the securement of tube 12 to base 18 only in plane 20, when pressure is exerted on extension tube 16 and tubing 26 in a downward direction 24, such as by the weight of tubes 16 and 26, during harsh environmental conditions such as engine vibrations, the connection sub-region 30 may fail such that tube 12 becomes disengaged from base 18 in connection sub-region 30.

Still referring to FIG. 2, prior art elbow 10 defines a height 32 that is defined by the radius of curvature 33 of elbow 10. Radius of curvature 33 defines a center of curvature 35 that is positioned above the end of tube 14 secured to base 18, as defined by plane 20, and above the bottom surface 22 of base 18. The height 32 of elbow 10 may position elbow 10 in contact with adjacent components within an engine compartment. Accordingly, prior art elbow 10 suffers from the disadvantages of susceptibility to vibration fatigue failure and causing interference with adjacent engine compartment components.

Figure 3:
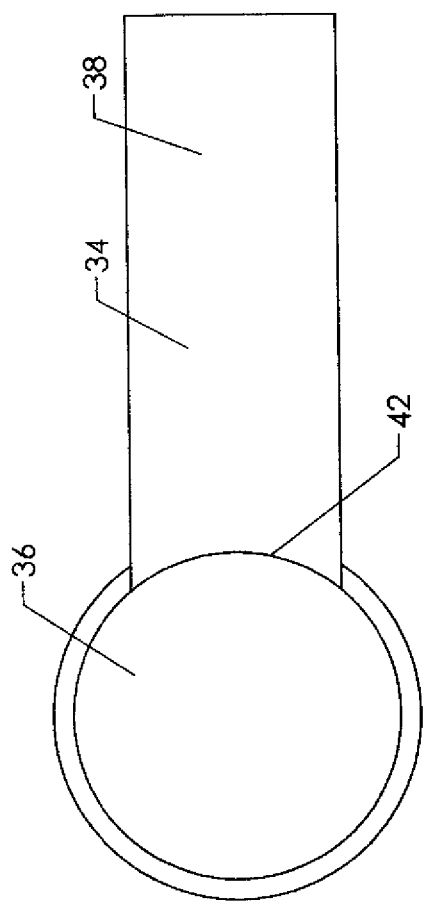
FIG. 3 is a top view of a prior art right angle elbow.
Figure 4:
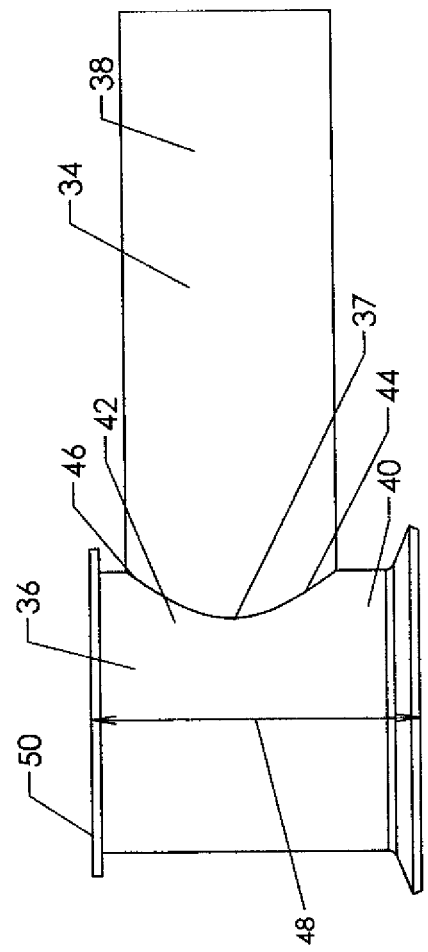
FIG. 4 is a side view of a prior art right angle elbow.

FIG. 3 is a top view of a prior art right angle elbow 34.
FIG. 4 is a side view of a prior art right angle elbow 34. Prior art elbow 34 includes a base tube 36 and a straight extension tube 38 that are secured together around a circumference 37 of straight extension tube 38 only on a vertical side 40 of base tube 36, and only on a single side 42 of base tube 36, in this embodiment, the right side 42 of base tube 36. Accordingly, elbow 34 defines a connection region 44 that is limited to the vertical side 42 of base tube 36. Securement on only single side 42 of base tube 36 presents similar vibration fatigue failure problems associated with full radius elbow 10 (FIG. 2). In particular, right angle elbow 34 is susceptible to vibration fatigue failure in a top sub-region 46 of connection region 44.

The reduced height 48 of right angle elbow 34 reduces the interference of elbow 34 with components within an engine compartment. However, right angle elbow 34 presents a significant increase in resistance to exhaust gas flow, thereby increasing exhaust back-pressure. Engine manufacturers typically limit the maximum permissible exhaust back-pressure in applications for their engines. Accordingly, right angle fabrications such as elbow 34 exceed the maximum permissible back-pressure limits that are acceptable to engine manufacturers.

The exhaust elbows of the prior art are only secured in a single plane, either the horizontal plane in the case of full radius elbow 10, or in the vertical plane in the case of right angle elbow 34. Full radius elbow 10 defines a height that interferes with adjacent engine components and right angle elbow 34 produces an impermissible exhaust back-pressure. There is a need, therefore, for an exhaust elbow that defines a reduced height, provides reduced vibration fatigue failure, and which does not increase the exhaust back-pressure of exhaust gases.

Figure 5:
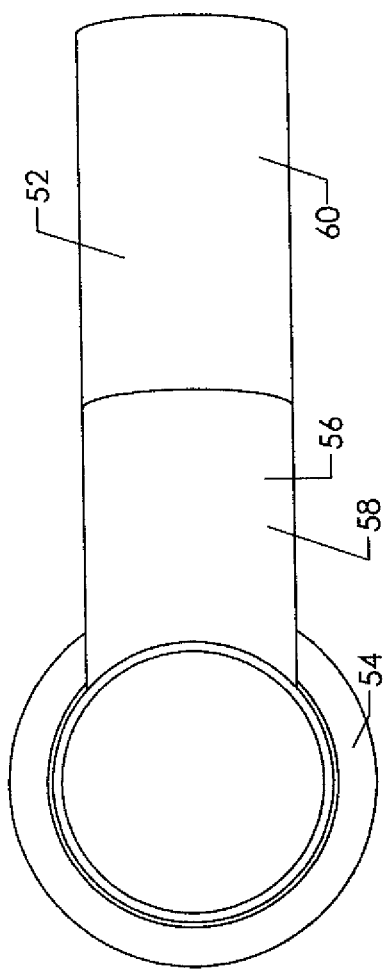
FIG. 5 is a top view of one example embodiment of a mitered elbow of the present invention.

FIG. 5 is a top view of one example embodiment of a mitered elbow 52 of the present invention. Mitered elbow 52 includes a base 54, a tube 56 including a bend region 58, and an extension tube 60. Base 54 may be structured to have a flared flange on a lower surface so that it may be secured to a mating flange component on an engine with a Marmon flange type connection.

Figure 6:
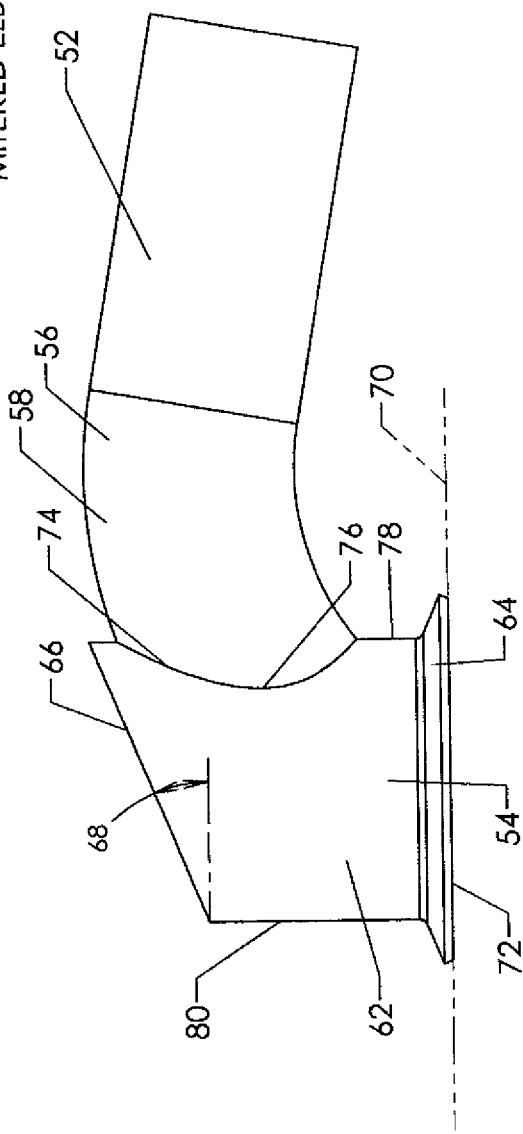
FIG. 6 is a side view of one example embodiment of a mitered elbow of the present invention.

FIG. 6 is a side view of one example embodiment of a mitered elbow 52 of the present invention. Base 54 of elbow 52 includes a curved side wall 62 secured to a connection base region 64 and a flat top surface 66 that is inclined at an acute angle 68 in a range of two to eighty degrees with respect to a plane 70 defined by a bottom surface 72 of connection base region 64 of base 54. In one preferred embodiment angle 68 is approximately thirty degrees.

Tube 56 may be secured to base 54 completely around a circumference 74 of an aperture 76 in a side surface 78 of base 54 where tube 56 extends through aperture 76. Tube 56 may further be secured to base 54 on an opposite side 80 of base 54 from side surface 78, as will be described with respect to FIG. 8.

FIG. 7 is a top view of the mitered elbow 52 of the present invention showing a section line A-A.

FIG. 8 is a cross sectional side view of the mitered elbow 52 of FIG. 7 taken along section line A-A. In this embodiment, tube 56 is shown secured around circumference 74 of aperture 76 in side surface 78 of base 54 where tube 56 extends through aperture 76 and is secured by a weld 82, for example. Weld 82 may include discrete regions of weld material positioned around circumference 74 of aperture 76 of base 54. In another embodiment, weld 82 may define a continuous weld that extends completely around circumference 74 of aperture 76 such that weld 82 secures tube 56 to base 54 completely around circumference 74. In other embodiments other fastening means may be utilized such as adhesive or the like.

Still referring to FIG. 8, tube 56 may define a tube axis 84 that extends through the center of tube 56. Tube 56 further includes an end surface 86 positioned within base 54, wherein end surface 86 of tube 56 defines an angle that is not perpendicular to axis 84. In the embodiment shown, tube end surface 86 may define an angle 88 with respect to tube axis 84 at end surface 86 of in a range of ten to eighty degrees, and in the embodiment shown, an angle 88 of approximately forty five degrees. Because end surface 86 of tube 56 is positioned at an angle 88 other than ninety degrees to axis 84, end surface 86 of tube 56 will contact two side surfaces of base 54. In particular, tube 56 will contact side surface 78 and side surface 80 which is opposite from side surface 78 of base 54. Accordingly, end surface 86 of tube 56 positioned within base 54 may be secured to two sides of base 54, namely, tube 56 may be secured to side 78 through which tube 56 extends by weld 82, and tube 56 may further be secured to base 54 on opposite side 80 of base 54 from side surface 78, by a weld 90, or another fastening means, such as adhesive. Weld 90 may further extend around end surface 86 to define a continuous weld 92, a portion shown thereof for ease of illustration. Due to the angle 88 of end surface 86 of tube 56 within base 54, weld 90 and or 92 is easily accomplished by accessing the interior of base 54 through open end 94 of bottom surface 72 of base 54. In a preferred embodiment, angle 88 is chosen so that end surface 86 is positioned in a plane 98 that is parallel to plane 70 of bottom surface 72 of base 54.

Weld 90 and or 92 are positioned in plane 98 that is parallel to plane 70 of bottom surface 72 of base 54. Weld 82 is positioned in plane 96 that is perpendicular to plane 70 of bottom surface 72 of base 54. Accordingly, tube 56 is secured to base 54 on first 78 and second 80 sides of base 54, and in first 96 and second 98 planes that are perpendicular to one another. Due to this multi location and multi plane securement of tube 56 to base 54, mitered elbow 52 has increased resistance to vibration fatigue failure than prior art exhaust elbows.

Bend region 58 of tube 56 of mitered elbow 52 defines a radius of curvature 108 that defines a center of curvature 110 that is positioned below the end surface 86 of tube 56 secured to base 54, as defined by plane 98, and below the bottom surface 72 of base 54 as defined by plane 70. This large radius of curvature 108, having a center of curvature 110 positioned below the lower surface of the bent tube and below the lower surface of the base, when compared to the smaller radius of curvature 33 of the prior art full radius elbow 10 (FIG. 2), results in a shorter height 104 of elbow 52 when compared to the height 32 of elbows 10 of the prior art.

Figure 9:
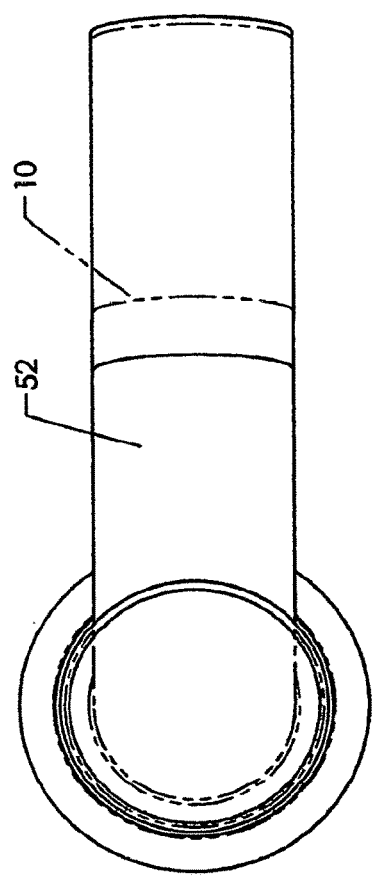
FIG. 9 is a top view of a comparison of the mitered elbow of the present invention and the full radius elbow of the prior art.

FIG. 9 is a top view of a comparison of the mitered elbow 52 of the present invention and the full radius elbow 10 of the prior art (shown in dash lines).

Figure 10:
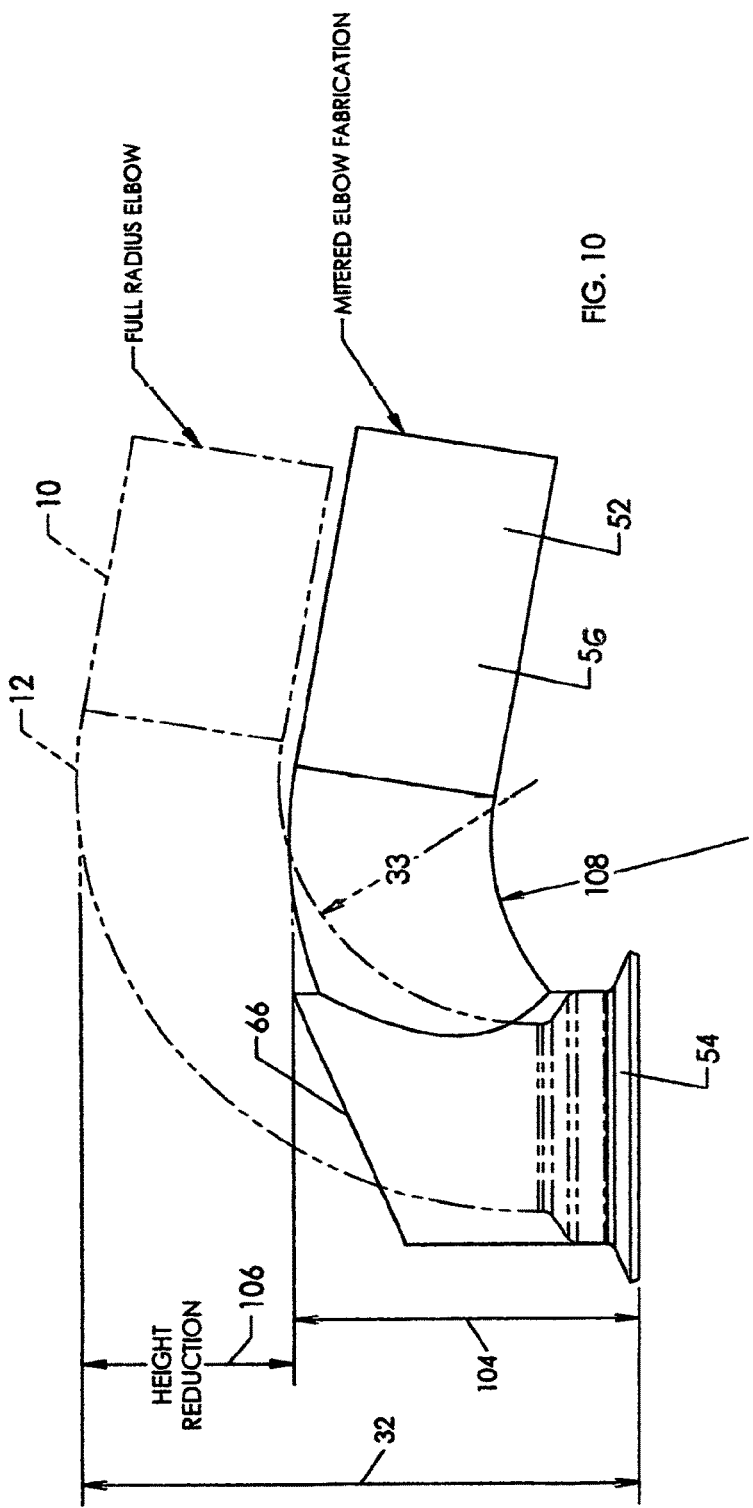
FIG. 10 is a side view of a comparison of the mitered elbow of the present invention and the full radius elbow of the prior art.

FIG. 10 is a side view of a comparison of the mitered elbow 52 of the present invention and the full radius elbow 10 of the prior art (shown in dash lines). Tube 12 of full radius elbow 10 (shown in dash lines) defines a radius of curvature 33 (shown partially for ease of illustration) that is smaller in length than the radius of curvature 108 (shown partially for ease of illustration) of mitered elbow 52. In other words, full radius elbow 10 defines a tighter curvature of its exhaust gas path through tube 12 than the more gradual curvature of the exhaust gas path through tube 56 of mitered elbow 52. The more gradual curvature, i.e., the longer radius of curvature of mitered elbow 52, is believed to reduce the exhaust back pressure of gas exiting the mitered elbow 52 when compared to prior art elbows.

Again referring to FIG. 6, mitered elbow 52 includes an inclined top surface 66 of base 54 wherein surface 66 is inclined with respect to plane 70 of bottom surface 72. The inclined top surface 66 is believed to reduce the exhaust back pressure of gas exiting through mitered elbow 52 when compared to prior art right angle elbows 34 (FIG. 4) that include a top surface 50 that is parallel to a plane of the bottom surface of the base, such as the bottom surface of base tube 36.

Additionally, in the present invention mitered elbow 52 defines a height 104 (FIG. 10) that is less than the height 32 of full radius elbow 10 of the prior art. The reduction in height 106 may be as much as a thirty percent reduction in height, or more.

Manufacture of the elbow 52 will now be described. Base 54 is manufactured including aperture 76 therein. The side wall of base 54 may be formed perpendicular to the bottom surface 72 of the base 54. Tube 56 is formed having end surface 86 and radius of curvature 108. End surface 86 is formed at a predetermined angle 88 with respect to the axis 84 of the tube. Angle 88 may be chosen so that when manufacture is completed, end surface 86 of tube 56 will be parallel to the bottom surface 72 of base 54. End surface 86 of tube 56 is positioned through aperture 76 of base 54 such that end surface 86 contacts an opposite side 80 of base 54 from aperture 76. Tube 56 is then welded to base 54 at the contact point of end surface 86 at opposite side wall 80 of base 54 and around aperture 76 of base 54. The weld of end surface 86 at opposite wall 80 is performed in the interior of base 54 through the open bottom surface 72 of base 54. The weld at end surface 86 may include one point weld on opposite side 80 of the base, multiple point welds around the perimeter of end surface 86 within base 54, or may include a continuous weld around the entire perimeter of end surface 86 within base 54. The weld of tube 56 through aperture 76 may be performed on an exterior of base 54. The weld at aperture 76 may include one point weld on side surface 78 of the base, multiple point welds around the perimeter of tube 56 as it extends through aperture 76 into base 54, or may include a continuous weld around the entire circumference of tube 56 where the tube extends through aperture 76. Base 54 may be manufactured to include an inclined top surface 66.

Accordingly, there is provided a low profile elbow that provides reduced height and reduced engine compartment interference when compared to prior art elbows, provides reduced susceptibility to vibration fatigue failure when compared to prior art elbows, and that provides reduced back-pressure of exhaust gasses through the elbow when compared to prior art elbows.

As may be understood from the above description and drawings, the present invention has many advantages over prior art devices. In the above description numerous details have been set forth in order to provide a more through understanding of the present invention. It will be obvious, however, to one skilled in the art that the present invention may be practiced using other equivalent designs.

I claim:

1. An elbow comprising:
  a base including a lower surface that defines a first plane and a side surface extending perpendicularly upwardly from said lower surface, said side surface including an aperture positioned therein; and
  a tube including a tube axis, a bend region and an end surface, said end surface defining a plane positioned at an acute angle with respect to said tube axis, and said bend region extending through and secured to said aperture of said base.

2. The elbow of claim 1 wherein said side surface is a cylindrical side surface positioned perpendicular to said first plane, said cylindrical side surface defines a hollow interior of said base, said aperture is positioned completely within said cylindrical side surface, and wherein said end surface of said tube is positioned within said hollow interior of said base and secured to said base at a position on said side surface opposite said base from said aperture.

3. The elbow of claim 2 wherein said tube is secured to said aperture, said aperture positioned completely in a side surface plane positioned perpendicular to said first plane of said base, and wherein said tube is secured to said base around a circumference of said end surface in said end surface plane positioned parallel to said first plane of said base.

4. The elbow of claim 1 wherein said base defines a top surface positioned opposite said base from said lower surface, and wherein said top surface defines an acute angle with respect to said first plane of said lower surface of said base, and wherein said top surface comprises a solid surface having an absence of apertures extending there through.

5. The elbow of claim 1 wherein said bend region of said tube defines a radius of curvature having a center of curvature positioned below said end surface plane defined by said end surface of said tube positioned within said base.

6. The elbow of claim 1 wherein said bend region of said tube defines a radius of curvature having a center of curvature positioned below said first plane defined by said lower surface of said base.

7. An elbow comprising:
  a base including a lower surface and a side surface extending perpendicularly upwardly from said lower surface, said side surface including an aperture therein; and
  a tube including an end surface, said tube extending through and secured to said side surface at said aperture of said base and said end surface of said tube secured to said base at a position on said side surface opposite said base from said aperture.

8. The elbow of claim 7 wherein said end surface defines a plane positioned at an acute angle with respect to a tube axis.

9. The elbow of claim 7 wherein said tube is secured to said aperture, said aperture positioned in a side surface plane positioned perpendicular to a plane defined by said lower surface of said base, and wherein said tube is secured to said base around a circumference of said end surface in a plane positioned parallel to said plane of said lower surface of said base.

10. The elbow of claim 7 wherein said base defines a solid top surface positioned opposite said base from said lower surface, and wherein said top surface defines an acute angle with respect to a plane of said lower surface of said base.

11. The elbow of claim 7 wherein a bend region of said tube defines a radius of curvature having a center of curvature positioned below a plane defined by an end surface of said tube positioned within said base.

12. The elbow of claim 7 wherein a bend region of said tube defines a radius of curvature having a center of curvature positioned below a plane defined by said lower surface of said base.

13. An elbow comprising:
  a base including a lower surface that defines a first plane and a side surface extending perpendicularly upwardly from said lower surface, said side surface including an aperture therein; and
  a tube including an end surface, said tube extending through and secured to said side surface at said aperture of said base in a plane perpendicular to said first plane, and said end surface of said tube secured to said base at least partially around a circumference of said end surface in a plane parallel to said first plane of said base.

14. The elbow of claim 13 wherein said end surface of said tube is secured to said base completely around a circumference of said end surface in said plane parallel to said first plane of said base.

15. The elbow of claim 13 wherein said end surface of said tube defines a plane positioned at an acute angle with respect to a tube axis.

16. The elbow of claim 13 wherein said tube is secured to said base at a position on said side surface opposite said base from said aperture.

17. The elbow of claim 13 wherein said base defines a flat top surface positioned opposite said base from said lower surface, and wherein said flat top surface defines an acute angle with respect to said first plane of said lower surface of said base.

18. The elbow of claim 13 wherein a bend region of said tube defines a radius of curvature having a center of curvature positioned below a plane defined by an end surface of said tube positioned within said base.

19. The elbow of claim 13 wherein a bend region of said tube defines a radius of curvature having a center of curvature positioned below said first plane defined by said lower surface of said bases.

20. The elbow of claim 13 wherein said end surface of said tube secured to said base at least partially around a circumference of said end surface is secured to said base by a weld positioned in an interior of said base.

* * * * *